United States Patent [19]
Wilkie

[11] Patent Number: 6,022,612
[45] Date of Patent: Feb. 8, 2000

[54] BIAXIALLY ORIENTED POLYPROPYLENE FILMS HAVING MATTE-FINISH AND IMPROVED COLD SEAL RECEPTIVITY

[75] Inventor: Andrew F. Wilkie, Haverhill, Mass.

[73] Assignee: Applied Extrusion Technologies, Inc., Peabody, Mass.

[21] Appl. No.: 08/673,619

[22] Filed: Jun. 25, 1996

[51] Int. Cl.⁷ .................................................. B32B 27/32
[52] U.S. Cl. ........................... 428/215; 428/336; 428/409; 428/220; 428/349; 428/515; 428/516; 428/517
[58] Field of Search .................................... 525/90, 70, 93; 428/517, 519, 337, 336, 215, 220, 409, 515, 516, 349

[56] References Cited

U.S. PATENT DOCUMENTS

| | | | |
|---|---|---|---|
| 4,367,312 | 1/1983 | Bontinck et al. | 525/93 |
| 4,548,988 | 10/1985 | Castelein | 525/51 |
| 4,585,679 | 4/1986 | Karabedian | 428/35 |
| 5,380,810 | 1/1995 | Lai et al. | 526/352 |
| 5,451,439 | 9/1995 | Bigg | 428/36.8 |

OTHER PUBLICATIONS

"Surface Modification" The Encyclopedia of Polymer Science and Engineering, Sup.vol. pp. 674–689, 1985ed.

*Primary Examiner*—Paul Thibodeau
*Assistant Examiner*—D. Lawrence Tarazano
*Attorney, Agent, or Firm*—Caesar, Rivise, Bernstein, Cohen, & Pokotilow, Ltd.

[57] ABSTRACT

Packaging films include a polymeric surface layer made from a blend of polyolefin and thermoplastic rubber, particularly a blend of polyolefin and styrene-isoprene-styrene (SIS) block copolymer or styrene-butadiene-styrene (SBS) block copolymer. The films provide a matte-finish surface without the need for surface treatments. The films can alternatively be surface modified to provide excellent cold seal receptive layers.

12 Claims, 3 Drawing Sheets

BIAXIALLY ORIENTED POLYPROPYLENE FILMS HAVING MATTE-FINISH AND IMPROVED COLD SEAL RECEPTIVITY

FIELD OF THE INVENTION

The present invention relates to single web or composite, oriented polyolefin, preferably polypropylene, films which exhibit either a matte-finish or improved cold seal receptivity. More specifically, the present invention relates to composite, biaxially oriented polypropylene films which provide a uniform matte-finish surface and excellent cold seal receptivity.

BACKGROUND OF THE INVENTION

Packaging films which have a matte-finish are aesthetically useful for many applications. A matte-finish can be used to provide a desirable satin paper-like finish when employed as an outer surface of a packaged product. Films having a matte-finish surface are particularly useful as outer webs of laminated composite packaging films such as those used to package snack foods, bakery products, and other confectioneries such as candy.

Matte-finish films are also useful as tape base films where a pressure sensitive adhesive is applied to the reverse side of the film and an overlacquer is applied to the matte-finish surface. The use of such films eliminates the need for an expensive matte coating step prior to application of the overlacquer. Matte-finish films can also be used in graphic arts applications where a non-glossy satiny-paper look is desired on an exposed surface, such as in book covers. In addition, matte-finish surfaces can generally be written on with a variety of printing inks.

Many matte-finish films are currently available but are manufactured out-of-line as coatings which are subsequently applied to an existing film surface. The matte-finish coatings generally comprise a combination of ingredients which yield a pressure sensitive adhesive layer. Such films are taught, for example, in U.S. Pat. No. 5,342,339. Such a process involves double film handling and is uneconomical compared to coextrusion techniques.

An alternative route to a matte-finish film surface has been achieved by exposing one or more surface of a substrate to an embossing or impression roller which physically changes the surface roughness of the substrate. Many embossing techniques are known.

Within the field of biaxially oriented polypropylene (BOPP) films, it is known that ethylene-propylene block copolymers can be used to achieve a matte-finish appearance. Such technology is especially popular in Japan. Domestic matte-finish BOPP products are also available but the exact compositions and methods of obtaining a matte-finish on these films are not known.

U.S. Pat. No. 4,996,096 teaches a coextruded non-embossed matte-finish film made from a polymer blend which consists of a tackifier, polyisobutylene (10–40% by weight), high density polyethylene (50–90% by weight), and optionally polypropylene homopolymer (0–40% by weight). This matte layer is preferably coextruded on a pigmented, non-transparent polyolefin core layer.

Many packaging films are used in combination with cold seal adhesives and cohesives to form air-tight hermetic packages. For many packaging applications, films employing cold seals and having a matte-finish are desirable.

Cold seals for packaging films may comprise blends of natural rubber (cis-polyisoprene) latex with a synthetic polymer adhesive such as an ethylene vinyl acetate (EVA) or acrylic. Such cold seals are water based emulsions (latexes) which may also contain minor ingredients such as wetting agents, stabilizers, defoamers, antiblock agents, colorants, etc. Cold seals are usually applied by either direct gravure, roller coat, spray or Meyer rod to a flexible packaging substrate in a pattern about one half inch wide surrounding the anticipated perimeter of a product to be wrapped. The volatile components of cold seals, such as the main volatile—water, are normally removed by forced hot air. Thereafter, a solid layer of material, between about 2 to 4.5 pounds per ream, is left remaining on the substrate surface.

One method of cold sealing involves joining the cold seal to itself and forming a packaging closure by applying pressure for a period of time at ambient temperatures. This type of closure method is commonly referred to as "cohesive" or "self" sealing. This, and other types of cold seals are particularly useful in wrapping products that are heat sensitive, for example, confectioneries, ice cream, bakery products, and dairy products such as cheese.

Cold seal cohesives are becoming the sealing medium of choice over traditional heat seal materials when faster packaging speeds and improved seal quality and consistency are desired. Cold seals also have the advantages of not causing the packaging substrate to melt during equipment shut downs or stoppages. In addition, cold sealing can save energy and time when compared to the operation, maintenance and control of heat sealing equipment.

Configurations for flexible cold seal packaging laminates comprise an outer web constructed of 50 to 100 gauge biaxially oriented polypropylene (BOPP) film having a slip and antiblock modified cold seal release layer formed thereon. Reverse printed ink may then be applied to the BOPP film surface opposite the release layer, and a laminating adhesive or polyethylene extrusion is typically applied between the outer web and an inner web. The inner web typically comprises a cold seal receptive BOPP or polyethylene terephthalate (PET) metallized, clear or opaque white film having a thickness of from 32 to 150 gauge. A cold seal latex cohesive is applied in a registered pattern onto the exposed surface of the inner web.

Flexible single web cold seal packaging configurations for confectioneries are also known. Single web configurations comprise a 50 to 150 gauge cold seal receptive BOPP or PET metallized, clear or white opaque film having surface printed ink applied to one side thereof. A cold seal latex cohesive is applied in a registered pattern to an opposite side thereof. An outer surface is formed over the surface printed ink and comprises an overprint, varnish and/or overlacquer.

For the aforementioned configurations and others, cold seal cohesives are generally applied to the inside (cold seal receptive surface) of a film lamination or to a single web film. In each case, the outer film surface (facing away from the cold seal) must repel adhesion to the cold seal on the inner web so that the roll stock may be unwound when it is used to wrap a product. In the case of a single web film, the surface opposing the cold seal cohesive is typically coated with a polyamide type overlacquer to provide sufficient release from the cold seal, i.e., to prevent roll blocking.

In order for a cold seal to be useful as a closure, the cold seal emulsion must have good wetting properties when applied to the cold seal receptive surface of the packaging film. In addition, the cold seal must exhibit strong anchorage, i.e., adhesion to the cold seal receptive surface, when dried. Absent sufficient anchorage, the cohesive can be stripped from the receptive layer resulting in breakage of an otherwise intact hermetic seal.

A need therefore exists for an improved cold seal receptive layer which provides excellent cold seal cohesive anchorage for a variety of cohesive compositions.

A need also exists for a matte-finish packaging film which exhibits an improved adhesion between a cold seal cohesive and the cold seal receptive surface.

SUMMARY OF THE INVENTION

The present invention is based upon the discovery of new packaging film formulations which offer a matte-finish surface and can additionally or alternatively offer excellent cold seal receptivity. According to the present invention, a very uniform matte-finish surface can be obtained and/or an unexpectedly high level of cold seal anchorage can be obtained by forming a polymeric surface layer from a blend of polyolefin and thermoplastic rubber, particularly a blend of polyolefin and styrene-isoprene-styrene (SIS) block copolymer.

The films of the present invention demonstrate:

A. Excellent adhesion of the cold seal composition on the cold seal receptive surface;

B. A range and choice of optical, particularly matte-finish properties;

C. Good printability on the cold seal receptive surface;

D. Good machinability and stiffness typical of oriented polypropylene film; and

E. An absence of deadening of the cold seal cohesive properties.

The films of the present invention have the following principal advantages over the prior art:

1. Permanently good cold seal receptivity and anchorage on the cold seal receptive surface;
2. The skin surface readily accepts code dating inks and ink pen inks; and
3. Uniform matte-finish without the use of fillers.

In another aspect of the present invention the skin layer is a cold seal receptive layer coated with a cold seal cohesive composition.

In yet another aspect of the present invention a packaging film including the inventive skin layer has a cold seal cohesive applied thereto and is used for wrapping items such as confectioneries.

In yet another embodiment of the invention the skin layer is a matte-finish layer used as an outer surface of a packaging film.

In yet another embodiment of the invention a composite structure packaging film is provided having a skin layer according to the invention, a core, and a cold seal release layer.

BRIEF DESCRIPTION OF THE DRAWINGS

The invention may be more fully understood with reference to the accompanying drawings wherein.

DETAILED DESCRIPTION OF THE INVENTION

In accordance with the present invention, I have discovered that new skin layers for packaging films can be provided by blending a combination of thermoplastic rubber and polyolefin and forming a thin film from the blend. Among many applications, the skin layer may be used for either or both of two purposes: as an exposed matte-finish surface layer which can readily be written on with a variety of printing inks; or as a cold seal receptive layer for anchoring a variety of cold seal cohesive compositions. Herein, the term "cold seal skin layer" is used to describe these blended layers of the present invention regardless of the intended use of the layer. Composite films including the skin layer are also provided by the present invention.

The Cold Seal Skin Layer

According to an embodiment of the present invention, the cold seal skin layer of the invention comprises a blend of between about 5% and about 95% by weight thermoplastic rubber and between about 5% and about 95% by weight polyolefin polymer. When the skin layer is used as a matte-finish layer, no additives are typically necessary, although a surface treatment of the layer may enhance a uniform matte-finish appearance. When the skin layer is used as a cold seal receptive layer, it is preferably surface treated and free of slip agents. Surface treatments to enhance matte-finish appearance and cold seal receptivity include chemical, corona discharge and flame treatments, or combinations thereof.

The skin layer of the invention may also be used as a matte-finish cold seal release layer, but would require the addition of migratory or non-migratory slip agents in an amount sufficient to significantly decrease the coefficient of friction of the layer and increase release properties. In general, the blends of the present invention tend to show high block propensity to cohesives when left untreated.

According to a preferred embodiment, the thermoplastic rubber of the skin layer blend is one or more rubbers selected from the group consisting of styrene-isoprene-styrene copolymers and styrene-butadiene-styrene copolymers. More preferably, the thermoplastic rubber is at least one member selected from the group consisting of styrene-isoprene-styrene midblock copolymers, diblock copolymers and triblock copolymers, and styrene-butadiene-styrene block copolymers. When the present skin layer is to be used as a matte-finish surface layer for accepting inks, it is preferable to use a styrene-isoprene-styrene block copolymer as the thermoplastic rubber.

The cold seal skin layer blend of the invention may more preferably comprise between about 30% and about 60% by weight of the thermoplastic rubber and between about 40% and about 70% by weight of the polyolefin polymer. According to a preferred embodiment, the blend contains about 50% by weight thermoplastic rubber and about 50% by weight polyolefin polymer.

In one embodiment of the invention, the thermoplastic rubber is a styrene-isoprene-styrene (SIS) copolymer having a weight ratio of styrene to isoprene in the range of from 14:86 to 30:70, with a weight ratio of styrene to isoprene of about 17:83 being more preferred. When used as either a matte-finish surface or as a cold seal receptive surface, the thermoplastic rubber may preferably be an SIS diblock or triblock copolymer with a styrene content of about 14% to 30% by weight and a Shore A hardness of about 32 to 69 units.

The thermoplastic rubber may also be a styrene-butadiene-styrene (SBS) block copolymer present in an amount of between about 5% and about 95% by weight. One preferred formulation for a cold seal receptive surface comprises an SBS block copolymer having a styrene content of about 28% by weight and a Shore A hardness of about 71 units.

The polyolefin polymer of the skin layer blend may comprise one or more member selected from the group consisting of high density polyethylene, linear low density polyethylene, isotactic homopolymer polypropylene, syndiotactic homopolymer polypropylene, ethylene-propylene random copolymers, ethylene-propylene block copolymers, copolymers made by metallocene catalysis of ethylene with other alkylenes (plastomers), ethylene-propylene-butylene terpolymers, blends of plastomers with syndiotactic homopolymer polypropylene, blends of syndiotactic homopolymer polypropylene with ethylene-propylene random copolymer, and mixtures thereof. For many applications, the polyolefin for the blend is preferably a high density polyethylene. For certain applications, a medium molecular weight high density polyethylene is preferred.

When used as a matte-finish surface layer, many of the above polymers are preferred as the polyolefin component of the blend. However, when used as a cold seal receptive surface, the skin layer blend may comprise any of the aforementioned polymers but preferably comprises high density polyethylene, homopolymer polypropylene, ethylene-propylene random copolymer, or mixtures thereof.

According to one embodiment wherein the skin layer is used as a cold seal receptive layer, the polyolefin component comprises a medium molecular high density polyethylene having a density of about 0.95 gm/cm$^3$. In addition to the high density polyethylene, the skin layer may preferably further comprise about 2000 ppm by weight of 2 $\mu$ crosslinked silicone spheres.

Other optional additives can be included in the skin layers of the present invention. The type and amount of such additives depends upon the intended use of the layer. Cross linked silicone particles having an average particle size of between about 2 $\mu$ and about 4.5 $\mu$ may be incorporated into the layer whether used as a matte-finish surface layer or as a cold seal receptive layer. A preferred range for the amount such silicone particles is between 1000 and 10,000 ppm by weight. Inorganic materials, such as clay, talc, diatomaceous earth and silicates may be incorporated into either type layer in amounts preferably ranging from about 1000 to about 10,000 ppm by weight.

Slip agents should be avoided in the layer if used as a cold seal receptive layer, but amides, amines, glycerol monostearate and other stearates may be added to the skin layer formulation if the layer is to be used as a matte-finish surface layer. A preferred range for the amount of such agents is from 0 to 10,000 ppm by weight. Slip agents are preferably employed in the layer if cold seal release properties are desired. If pigments are incorporated in the layer the amount used should be sufficient to achieve the desired color and shade.

Surface treatments are preferred in many applications of the skin layer to enhance either or both of matte-finish appearance and cold seal receptivity. Preferred surface treatments include chemical, flame and corona discharge treatments. Multiple treatments of the same type or different types may also be employed. The exposed surface of the layer may be treated for the purpose of enhancing at least one of the following properties: cold seal cohesive wetout, cold seal cohesive anchorage, maximum surface energy level, and matte-finish quality. However, good cold seal wet out can be obtained on non-treated surfaces also. Corona discharge treatments substantially diminish the heat sealing temperature use range; however, corona discharge is preferred if the skin layer is to be used as a matte-finish surface having cold seal release properties. By "heat seal" herein is meant temperatures generally in excess of 150° F. For many packaging operations, however, such temperatures are unacceptable.

If the skin layer is used as a matte-finish surface layer, it preferably has a thickness of from about 2 to about 20 gauge, with a thickness of about 5 gauge being preferred for many applications. Although no surface treatment is necessary to achieve a matte-finish appearance, surface treatments may be used to enhance such appearance.

The matte-finish surface may appear on either or both surfaces of the skin layer. According to an embodiment of the invention, a bonding layer is added by extrusion coating or coextrusion to a surface of a core layer and may be subsequently surface treated to better receive a matte-finish surface skin layer of the invention. According to another embodiment of the invention whereby a single web structure is provided, a heat sealable layer is included by, e.g., coextrusion onto a surface of the core layer.

If the skin layer is used as a cold seal receptive layer, it preferably has a thickness of from about 1 to about 20 gauge, with the range of from about 4 to about 8 gauge being more preferred. The surface is preferably subjected to a physical surface-modifying treatment to improve the bond between that surface and the subsequently applied cold seal composition. A number of treatments are discussed above, however, a preferred treatment involves subjecting the exposed surface of such layer to a high voltage electrical stress accompanied by corona discharge. Other such surface modifying treatments include flame treatment of the surface of such layer.

If used as a cold seal receptive layer, the skin layer may optionally also contain an adhesion enhancing agent to improve adhesion to the cold seal composition. One class of such agents are polar polymers.

The skin layer may also be formed as a cold seal receptive layer having cohesive receptive surfaces on both sides thereof. According to one embodiment of the invention, a bonding layer is added by extrusion coating or coextrusion to a surface of a core layer and is subsequently surface treated to better receive a cold seal receptive layer of the invention. If a bonding layer is included, it may be surface treated and subsequently metallized to enhance aesthetics and/or barrier properties.

Cold seal receptive films of the present invention exhibit excellent cold seal receptivity to commercially applied cold seal compositions. Additionally, good anti-block to reverse printing inks and good ink adhesion and lamination bond strengths on print or laminating surfaces are obtained by the present invention.

The Core Layer

The core layer of multilayer films according to the present invention preferably comprises one or more polymer selected from isotactic homopolymer polypropylene, syndiotactic homopolymer polypropylene, ethylene-propylene random copolymer, ethylene-propylene block copolymer, polybutylene homo- and copolymers, polyethylenes, ethylene-propylene-butylene terpolymers, and plastomers made by metallocene catalysis of ethylene and at least one member selected from the group consisting of pentene, hexene, heptene, octene, nonene and decene. Mixtures of two or more of these polymers may also be used for the core layer.

According to one embodiment of the invention, the core may include small quantities, e.g., less than about 10%, preferably 2% to 8%, of alpha-olefin polymers having from 2 to 4 carbon atoms, e.g., ethylene-propylene random copolymers, ethylene-propylene block copolymers and high density polyethylenes. The quantity of high density polyethylene is generally limited to less than 5%, preferably from 0.5% to 4.5% by weight. Preferably not more than about 4% of such other polymers are included in the core so as not to adversely effect the stiffness, clarity and other physical properties of the oriented polypropylene.

Small quantities of migratory and other additives can optionally be included in the core layer. Suitable additives include: saturated and unsaturated fatty acid amides containing from 16 to 22 carbon atoms such as erucamide and behenamide, and blends thereof; stearates such as glycerol monostearate; and amines. Other additives such as calcium stearate, or inorganics such as silicone oil, can also be added to the core layer, but these are often more useful when used within a cold seal release layer.

If the core is to be used with a matte-finish surface skin layer of the present invention, the core may preferably comprise between 0 and 5,000 ppm each of one or more of additives selected from amides, stearates and amines. If the core is to be used with a cold seal receptive skin layer of the present invention, the core may preferably comprise between 0 and 5,000 ppm each of one or more additives selected from amides, stearates and anti-static agents. In addition, pigments and cavitating agents may be incorporated into the core, and are preferred when the core is used with a cold seal receptive skin layer of the present invention.

The thickness of the core layer can vary widely between about 40 to about 200 gauge, with the range of 50 to 150 gauge being more preferred for some applications. The range of 50 to 100 gauge is even more preferred for many applications and the range of from 50 to 70 gauge is particularly well suited for many applications. The core layer may be corona discharge treated or flame treated.

Cold Seal Release Layer

If the films of the present invention are composite films, a release layer may additionally be a part of the composite structure. Release films such as though described in my U.S. Pat. Nos. 5,482,780 and 5,489,473 are suitable, as are those described in my copending U.S. patent application Ser. No. 08/655,542 entitled "Biaxially Oriented Polypropylene Cold Seal Release Films". Use of a release layer allows the invention to be practiced as a single web packaging film without the need for a release overlacquer.

Manufacture of the Films

Manufacture of the films according to the present invention is carried out by known processes such as by extrusion of the skin layer or coextrusion of the various layers. This includes coextruding through a flat film die the melt corresponding to the individual polymeric layers of the film, cooling the film obtained by coextrusion in order to harden it, orienting, e.g., biaxially stretching, the film, heat-setting the stretched film and surface modifying the surface, e.g., corona treating the cold seal skin layer and optionally surface treating the skin layer such as when it is desired to print thereon. The film can also be coextruded by the blown film or double bubble orientation process.

The composite film structure comprising the core and adherent cold seal release and cold seal receptive skins is stretched by conventional techniques to orient the film, prior to surface treatment such as by corona discharge. Orientation may be effected uniaxially, by stretching the film in one direction, or biaxially, by stretching the film in each of two mutually perpendicular directions in the plane of the film. Biaxial orientation is preferred.

The degree to which the film is stretched depends to some extent on the ultimate use for which the film is intended. Preferably, the film is stretched to between about 4 and about 6.5 times its original dimension in the longitudinal direction and to between about 5 and about 10 times in the transverse direction. The longitudinal stretching is expeditiously carried out with the aid of two rolls running at different speeds according to the stretch ratio desired and the transverse stretching with the aid of a corresponding tenter frame.

After stretching, the polymeric film is normally "heat set", while restrained against shrinkage at a temperature above the glass transition temperature of the polymer and below its melting point.

If the skin layer is used as a cold seal receptive layer, the layer may be, but is not necessarily, subjected to a physical surface-modifying treatment prior to application of the cold seal cohesive onto an exposed surface thereof. Such treatment improves the bond between that surface and the subsequently applied cold seal cohesive. A preferred treatment is to subject the exposed surface to a high voltage electrical stress accompanied by corona discharge. The film is then heat aged to impart further dimensional stability to the film. If a skin layer is provided as a release layer or outer surface on the opposite side of the core, the surface of such layer can be modified by corona discharge or flame treatment to make it more receptive to printing inks.

The thickness of the composite film of the present invention can vary over a wide range but is most preferably from about 60 to about 150 gauge.

The cold sealing process of the present invention is preferably achieved at a temperature of less than 150° F., and more preferably at a temperature range of from 65° F. to 85° F. In the cold sealing process of the present invention, the films of the invention are subjected to a sufficient pressure for a sufficient time to achieve the desired cold seal. The time needed for pressure application to achieve cold sealing can be from 0.1 to 1 second, depending upon the cohesive used, the amount of pressure applied, and other factors. This range of times, however, should not be construed as a limitation of the present invention. In one embodiment, the cold seal pressure can be from about 20 to 100 psi, and more preferably is from 70 to 90 psi.

The resulting cold sealed films of the present invention preferably exhibit a release force of from about zero to about 75 grams/inch, with the range of 5 to 50 grams per inch being preferred.

Examples—Cold Seal Receptive Skin Layer Formulations

Cold seal receptive surfaces were coextruded with a core layer of isotactic homopolymer polypropylene (PP) using conventional ¾ inch and one inch 24/1 L/D extruders, respectively. The PP base layer was about 30 mils (0.03 inch) thick and the coextruded surface layer was about 4 mils (0.004 inch) thick for a total cast sheet thickness of about 34 mils (0.034 inch). The cast sheet was cut into 2 in. by 2 in. squares and then simultaneously biaxially oriented in a T.M. Long laboratory orienting machine to six (6) times its dimensional length in both the transverse and machine (extrusion) directions. The finished oriented total film thickness ranged from about 0.75 mil to 0.95 mil. The coextruded cold seal receptive layer thickness was about 6 to 11 gauge. A total of 23 skin layer formulation examples including laboratory controls are given in Table I. The corresponding cold seal cohesive strengths for each example and selected comparison BOPP film controls are presented in Table II. The respective film optics properties for each example are shown in Table III.

Prior to cold seal cohesive coating, the laboratory film surfaces were prepared by using electrical discharge treatment of the surface skin layer with a laboratory corona treater. The treatment parameters were set up to give a surface tension level of about 40–45 dynes/cm, measured with formamide/ethycellosolve solutions, on the homopolymer PP control surface Example [A]. The treatment parameters were held constant and used on laboratory film Examples [B] through [W]. The cohesive used to illustrate the invention in Table II was Technical Coatings Coseal 30070. COSEAL 30070 is a general purpose waterbased cohesive with vinyl acetate functionality. The cohesive was applied to the corona treated cold seal receptive surface (of a single sheet of film) at 58.4±2% solids with a #7 Meyer rod (wire wound). The coated sheet was immediately placed in a convection oven with high air flow at 93° C. (200° F.) for 30 seconds. The resulting dry cohesive thickness was between 15 and 20 gauge.

The dried cohesive coated sheet was allowed to cool to room temperature then the cohesive was folded over onto itself and sealed between top and bottom serrated metal jaws. The serrations were set perpendicular to the front of the sealing machine at 20 teeth per inch with a 45° angle between the teeth peaks. The tooth depth from peak to valley was about 0.2 inches. The serrated seal jaws were closed with 60 psi actual pressure for a duration of 0.5 seconds at ambient temperature. The sealed cohesive was cut into one inch strips with a precision cutter in line with the serrations. The cohesive seals were pulled on a tensile testing machine at 2 in./min. crosshead speed. The cohesive strength was measured at the initial point of the seal (initial) and an average of all points (average) was taken in grams/in. The measurements were taken fresh, 24 hours ambient, and one week ambient aging. The cohesive strength results for Examples [A] through [W] are given in Table II.

Included with these data are BOPP production films (comparisons 1–4) which are examples of state of the art uncoated cold seal receptive films.

Herein, cohesive strength values which are referred to as a/b represent the values of initial cohesive strength (a) and the average cohesive strength (b) at the specified time after sealing that the strengths were measured. The phrase "average strengths a/b" refer to the rounded average of the initial values (a) taken fresh, after 24 hours, and after one week, and the rounded average of the average strengths taken fresh, after 24 hours, and after one week.

Examples [A] and [B], homopolymer PP and ethylene-propylene random copolymer (EPRCP) treated surfaces, respectively, serve as laboratory produced controls for the inventive experimental Examples [C] through [W]. The homopolymer PP laboratory control surface Example [A] averaged 310/250 gms/in. (initial/average) for the three test periods. The 3.0% ethylene EPRCP laboratory control surface Example [B] averaged 300/270 gms/in. The production control homopolymer PP surface (Comparison 4) averaged 270/255 gms/in. The production control EPRCP surface (Comparison 1) averaged 375/300 gms/in., which was significantly higher than the laboratory produced film surface. The commercially available matte surface film of Comparison 2 averaged 330/300 gms/in. The modified homopolymer PP production control surface (Comparison 3) averaged 240/235 gms/in.

The first inventive cold seal receptive surfaces shown in Examples [C] and [D] were blends of the EPRCP used in control Example [B], and a styrene-isoprene-styrene (SIS) block copolymer. The incorporation of the SIS copolymer at 10% and 20% by weight, respectively, resulted in significant increases in initial/average cohesive strength compared to the laboratory produced controls at 425/380 and 400/365 gms/in., respectively. These surfaces were also superior to the production controls. The corresponding optical and visual assessments for each film Example are given in Table III. Example [C] was clear and glossy. The increased SIS content in Example [D] resulted in a non-uniform, hazy film.

When the SIS was blended into the EPRCP at 20% and 30% by weight, Examples [E] and [F], the film haze (Table III) was increased and gloss decreased significantly with Example [F], which gave a medium matte finish. The highest cohesive strength averages were demonstrated with the medium matte surface, Example [F], at 425/405 gms/in. (initial/average). Example [G] had high haze and low 45° gloss resulting in a visually non-uniform matte surface which gave average cohesive strengths of 390/400 gms/in. Example [H] had a uniform matte surface but yielded a low cohesive strength average of only 280/235 gms/in. The SEBS blend with EPRCP, Example [I], produced a clear and glossy film that showed high cohesive strength after 24 hours ambient aging (390/390 gms/in.) but deteriorated after one week ambient aging to 350/280 gms/in.

Inventive surfaces in Examples [J] and [K] replaced the EPRCP at 50% by weight with a medium molecular weight high density homopolymer polyethylene (HDPE) which has a density of 0.945 gms/cc, a melting point of 257° F. and a melt index of 0.55 gms/10 min. at 190° C./2.16 kg. The HDPE was blended with SBS in Example [J] and SIS (source 2) in Example [K] both at 50/50% by weight. Example [J] gave a non-uniform (irregular) matte finish which yielded excellent cohesive bond strength after one week ambient aging at 530/490 gms/in. Example [K] had a very uniform matte finish surface that also yielded significantly improved cohesive strength compared to the controls, averaging 455/445 gms/in.

Example [L] (100% by weight HDPE) also demonstrated improved cohesive strength versus the controls averaging 370/350 gms/in. with very low haze and high gloss. Example [M] added a small amount, 5% by weight, of SIS (source 2) to the HDPE (95% by weight) which resulted in a hazy film with improved cohesive strength, particularly after one week ambient aging of the seal.

Inventive Examples [N], [O], and [P] blended the SIS (source 2) copolymer in with the HDPE at 25%, 50%, and 75% by weight, respectively. Example [O] demonstrated the highest level of cohesive strength averaging 425/405 gms/in. Example [O] also had high haze and very low gloss (45°) which gave a uniform matte surface. Example [P] also showed high cohesive strength averaging 370/400 gms/in. with a non-uniform grainy appearance.

Examples [N] and [O] were repeated in [Q] and [R] except that the HDPE component was replaced with homopolymer PP. The cohesive strength average of Example [Q] (320/310 gms/in.) was superior to Example [N] which averaged 295/280 gms/in. Example [R] averaged a cohesive strength of 330/315 gms/in. which was superior to the control Examples [A] and [B] but significantly lower than the more optimum Example [O] at 425/405 gms/in.

Inventive Examples [T], [U], [V] and [W] were 50% by weight blends of SIS (source 2) with EPRCP, PP homopolymer, HDPE and conventional LLDPE, respectively. Each skin layer of Examples [T], [U], [V] and [W] contained 2,000 ppm of 2 μ cross linked silicone spheres for COF reduction and better machinability. Example [T] averaged 350/330 gms/in., Example [U] 500/490 gms/in. and Example [V] 520/510 gms/in. cohesive strengths. Each film showed very high haze and a uniform matte finish. Example [W] had a non-uniform matte finish and very low cohesive strength averaging 225/205 gms/in. which was inferior to all control film surfaces. The COF values for the modified matte finish film surfaces in Table IV indicate that the best machinability would be found with Example [V] at 0.41/0.34 static/dynamic.

TABLE I

Skin Layer Formulations

| Example | Homopolymer Polypropylene | Ethylene Propylene Random Copolymer | High Density PE[2] | LLDPE[3] | SIS[4] (source 1) | SIS[5] (source 2) | SBS[6] | SEBS[7] |
|---|---|---|---|---|---|---|---|---|
| A | 100 | — | — | — | — | — | — | — |
| B | — | 100 | — | — | — | — | — | — |
| C | — | 90 | — | — | 10 | — | — | — |
| D | — | 80 | — | — | 20 | — | — | — |
| E | — | 60 | — | — | — | 20 | — | — |
| F | — | 70 | — | — | — | 30 | — | — |
| G | — | 50 | — | — | — | — | 50 | — |
| H | — | 50 | — | — | — | 50 | — | — |
| I | — | 50 | — | — | — | — | — | 50 |
| J | — | — | 50 | — | — | — | 50 | — |
| K | — | — | 50 | — | — | 50 | — | — |
| L | — | — | 100 | — | — | — | — | — |
| M | — | — | 95 | — | — | 5 | — | — |
| N | — | — | 75 | — | — | 25 | — | — |
| O | — | — | 50 | — | — | 50 | — | — |
| P | — | — | 25 | — | — | 75 | — | — |
| Q | 75 | — | — | — | — | 25 | — | — |
| R | 50 | — | — | — | — | 50 | — | — |
| S | 25 | — | — | — | — | 75 | — | — |
| T[1] | — | 50 | — | — | — | 50 | — | — |
| U[1] | 50 | — | — | — | — | 50 | — | — |
| V[1] | — | — | 50 | — | — | 50 | — | — |
| W[1] | — | — | — | 50 | — | 50 | — | — |

[1]Included 2,000 ppm 2μ cross-linked silicone.
[2]Polyethylene.
[3]Linear Low Density Polyethylene.
[4]Styrene-isoprene-styrene block copolymer having a styrene to rubber ratio of 14:86, a Shore A hardness of 37, and a Brookfield viscosity of 1450 cps at 25% in toluene.
[5]Styrene-isoprene-styrene copolymer having a styrene to rubber ratio of 17:83, a Shore A hardness of 32, and a Brookfield viscosity of 500 cps at 25% in toluene.
[6]Styrene-butadiene-styrene block copolymer having a styrene to rubber ratio of 28:72, a Shore A hardness of 71, and a Brookfield viscosity of 1200 cps at 25% in toluene.
[7]Styrene-ethylene-butylene-styrene diblock terpolymer having a styrene to rubber ratio of 30:70, a Shore A hardness of 60, and a Brookfield viscosity of 200 cps at 25% in toluene.

TABLE II

Cold Seal Strength (initial/average) in gms/in.

| Example | Fresh | 24 Hrs. Ambient | One Week Ambient |
|---|---|---|---|
| A | 315/255 | 300/240 | 310/250 |
| B | 300/280 | 245/235 | 345/295 |
| C | — | 425/380 | — |
| D | — | 400/365 | — |
| E | — | 415/330 | — |
| F | — | 425/405 | — |
| G | — | 400/385 | 380/415 |
| H | — | 270/275 | 290/200 |
| I | — | 390/390 | 350/280 |
| J | — | 380/390 | 530/490 |
| K | — | 425/430 | 490/460 |
| L | 400/355 | 335/330 | 380/370 |
| M | 350/320 | — | 375/410 |
| N | 300/285 | 240/230 | 350/330 |
| O | 480/440 | 345/310 | 450/470 |
| P | 385/380 | 400/420 | 335/400 |
| Q | 295/275 | 325/345 | 340/315 |
| R | 305/310 | 365/350 | 320/285 |
| S | — | — | — |

TABLE II-continued

Cold Seal Strength (initial/average) in gms/in.

| Example | Fresh | 24 Hrs. Ambient | One Week Ambient |
|---|---|---|---|
| T | — | 360/310 | 345/350 |
| U | — | 455/480 | 545/505 |
| V | — | 550/560 | 495/465 |
| W | — | 235/220 | 215/195 |
| Comparison 1[1] | 420/350 | 355/325 | 350/320 |
| Comparison 2[2] | 310/270 | 360/310 | 320 |
| Comparison 3[3] | 270/260 | 235/230 | 220 |
| Comparison 4[4] | 260/260 | 285/250 | 265/255 |

[1] 115 gauge coextruded both sides treated modified ethylene-propylene random copolymer (EPRCP) film.
[2] 60 gauge film believed to be coextruded treated ethylene-propylene block copolymer with a matte finish.
[3] 75 gauge monolayer both-sides treated homopolymer polypropylene film modified with a low molecular weight hydrocarbon tackifier.
[4] 118 gauge uncoated, non-slip, treated homopolymer polypropylene surface film.

TABLE III

Optics Data

| Example | % Haze | Gloss units @ 45° | Visual Appearance | Fresh | 24 Hrs. Ambient | One Week Ambient |
|---|---|---|---|---|---|---|
| A | 0.7 | 93 | Clear/Glossy | 315/255 | 300/240 | 310/250 |
| B | 0.6 | 94 | Clear/Glossy | 300/280 | 245/235 | 345/295 |
| C | 1.5 | 88 | Clear/Glossy | — | 425/380 | — |
| D | 6.9 | 85 | Non-uniform/hazy | — | 400/365 | — |
| E | 7.5 | 65 | Non-uniform/hazy | — | 415/330 | — |
| F | 21.7 | 42 | Medium matte | — | 425/405 | — |
| G | 40 | 16 | Non-uniform matte | — | 400/385 | 380/415 |
| H | 28 | 23 | Uniform matte | — | 270/275 | 290/200 |
| I | 1.6 | 89 | Smooth/Glossy | — | 390/390 | 350/280 |
| J | 27 | 44 | Non-uniform matte | — | 380/390 | 530/490 |
| K | 48 | 20 | Uniform matte | — | 425/430 | 490/460 |
| L | 0.9 | 94 | Clear/Glossy | 400/355 | 335/330 | 380/370 |
| M | 6.3 | 38 | Non-uniform/hazy | 350/320 | — | 375/410 |
| N | 15.1 | 48 | Brushed Aluminum | 300/285 | 240/230 | 350/330 |
| O | 46 | 19 | Uniform matte | 480/440 | 345/310 | 450/470 |
| P | 24 | 54 | Non-uniform/Grainy | 385/380 | 400/420 | 335/400 |
| Q | 4.9 | 73 | Streaky/Non-matte | 295/275 | 325/345 | 340/315 |
| R | 64 | 10 | Uniform matte | 305/310 | 365/350 | 320/285 |
| S | n/a | n/a | — | — | — | — |
| T | 49 | 20 | Uniform matte | — | 360/310 | 345/350 |
| U | 78 | n/a | Uniform matte | — | 455/480 | 545/505 |
| V | 60 | 14 | Uniform matte | — | 550/560 | 495/465 |
| W | 22 | n/a | Non-uniform matte | — | 235/220 | 215/195 |
| Comparison 1 | 3.0 | 86 | Clear/Medium Gloss | 420/350 | 355/325 | 350/320 |
| Comparison 2 | n/a metallized | n/a | Matte | 310/270 | 360/310 | 320 |
| Comparison 3 | 1.9 | 92 | Clear/Glossy | 270/260 | 235/230 | 220 |
| Comparison 4 | 1.0 | 94 | Clear/Glossy | 260/260 | 285/250 | 265/255 |

TABLE IV

Coefficient Of Friction Data[1]

| Example | Coefficient Of Friction Film/Film Static/Dynamic |
|---|---|
| A | 0.49/0.50 |
| T | 0.58/0.52 |
| U | 0.48/0.52 |
| V | 0.41/0.34 |
| W | 0.58/0.65 |

[1] 200 gm sled TMI

Examples—Matte-Finish Surface Skin Layer Formulations

Matte finish polymeric surfaces were coextruded on a base layer of homopolymer polypropylene (PP) using conventional ¾ inch and one inch 24/1 L/D extruders, respectively. The PP base layer was about 30 mils (0.03 inch) thick and the coextruded matte surface layer was about 4 mils (0.004 inch) thick for a total cast sheet thickness of about 34 mils (0.034 inch). The cast sheet was cut into 2 in. by 2 in. squares and then simultaneously biaxially oriented on a T.M. Long laboratory orienting machine to six (6) times its dimensional length in both the transverse and machine (extrusion) directions. The finished oriented total film thickness ranged from about 0.75 mil to 0.95 mil. The coextruded matte finish layer thickness was about 6 to 11 gauge. Twenty four formulations involving coextruded matte finish polymer blends and controls are presented in Table V. The resulting haze, gloss, and visual appearance of each film variable are given in Table VI. Corresponding surface photomicrographs of selected Examples taken with a differential interference contrast (DIC) light microscope at 200×, are presented in FIGS. 1–5. The 200× surface photographs were taken in bright field with direct top lighting.

Figure 1:
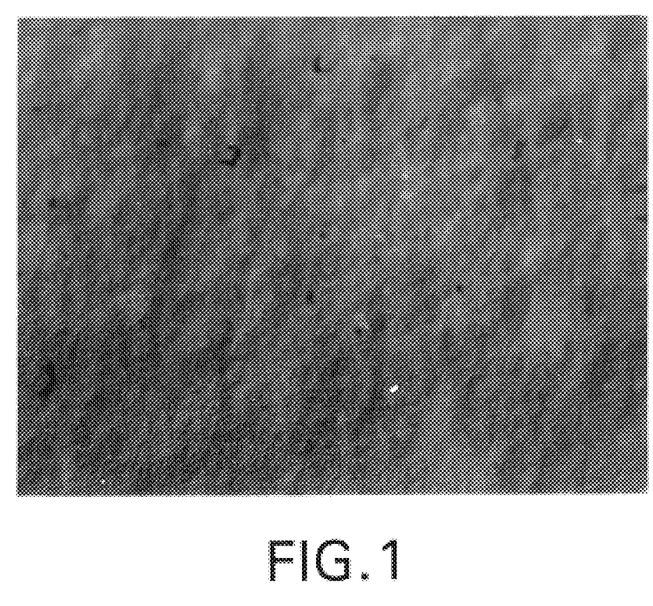
FIG. 1 is a photomicrograph showing the film surface of a commercially available film.
Figure 2:
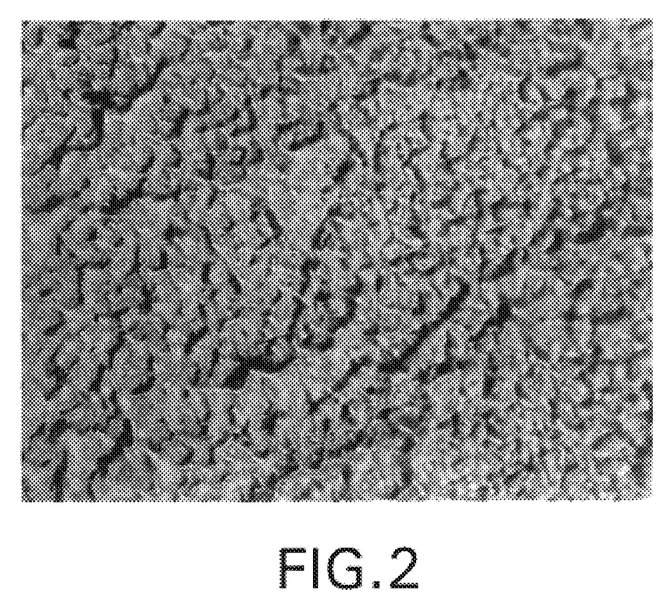
FIG. 2 is a photomicrograph showing the film surface of a layer according to the present invention.
Figure 3:
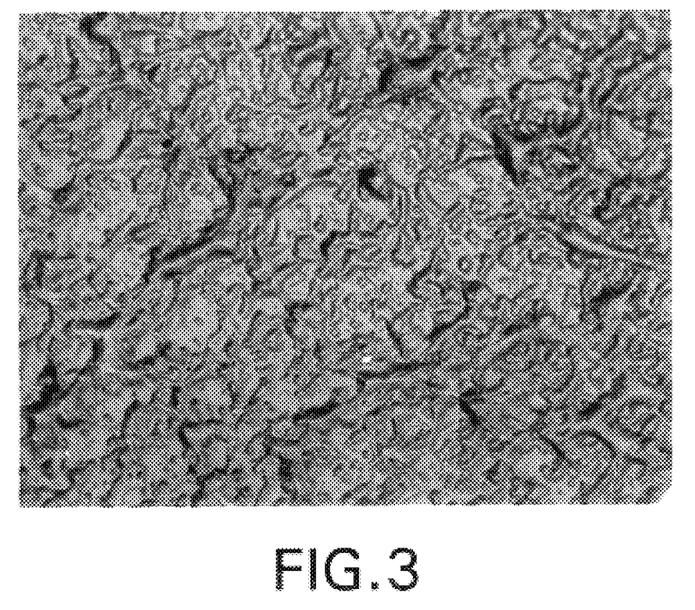
FIG. 3 is a photomicrograph showing the film surface of a layer according to another embodiment of the present invention.
Figure 4:
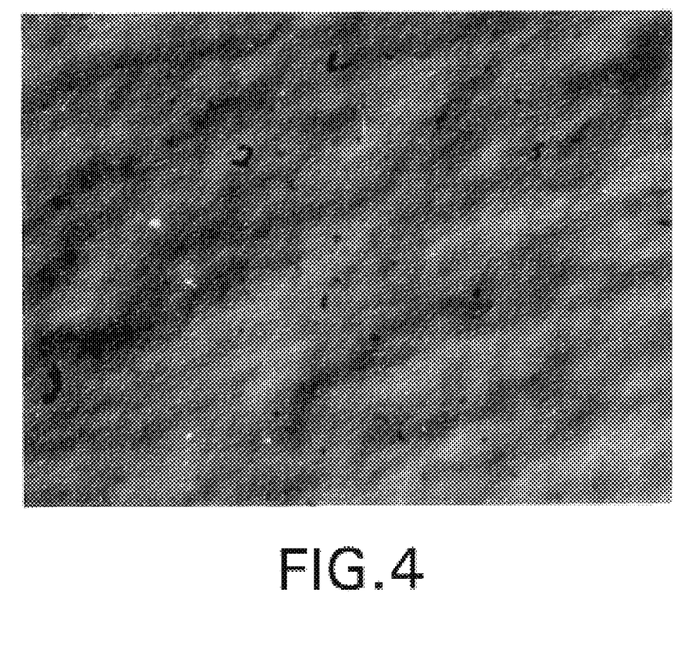
FIG. 4 is a photomicrograph showing the film surface of another commercially available film.

The control non-matte finish surfaces are given by Examples [AA] homopolymer polypropylene (PP), [PP] ethylene-propylene random copolymer (EPRCP), and [RR] high density homopolymer polyethylene (HDPE). These film surfaces are defined as relatively smooth and continuous with very low haze (<2.0%) and very high 45° gloss (>90 units). The film surface of control Example [AA] is shown in FIG. 1 and the surface of control Example [RR] is shown in FIG. 4.

The first series of experiments, Examples [BB], [CC], [DD], and [EE], involved blends of increasing levels of a styrene-isoprene-styrene (SIS—source 1) thermoplastic rubber in amounts of from 10% to 40% by weight with a conventional EPRCP. There was a significant departure in film surface smoothness beginning at about 30% by weight and increasing at 40% by weight. The haze increased and gloss values decreased significantly at 40% by weight SIS (source 1). An analysis of Example [EE] shows a distinctly irregular, rough surface and what appear to be clear area crevices between the high peaks of the rough surface. A macro or normal view of the film surfaces of the first series indicated a slight matte finish at 40% by weight, which concurs with the haze, gloss, and visual data.

The next series of experiments was conducted with another SIS linear thermoplastic rubber (source 2). The two SIS copolymers differed in molecular weight and styrene/isoprene ratio. The source 2 SIS was blended with EPRCP at 10% to 40% by weight in Examples [FF], [GG], [HH], and [II]. Significant surface roughening was observed at 30% and 40% by weight levels. A macro appearance view indicated uniform medium to high matte finishes with Examples [HH] and [II]. The haze and 45° gloss values were >20% and <45 units, respectively. Polymer blends with <30% by weight SIS (source 2) yielded streaky non-uniform, non-matte surfaces.

The third series of experiments involved blending 50% by weight of a conventional EPRCP (melt index of 3.0 gms/10 min.) with 50% by weight of the following: SIS (source 2) [JJ], SBS (styrene-butadiene-styrene) [KK], SEBS (source 1) (styrene-ethylene-butylene-styrene) [LL], and SEBS (source 2) [MM], all of which are thermoplastic rubbers. The source 2 SIS produced the most uniform distinct matte finish surface [JJ] as evidenced by the high haze 23%–33% and very low 45° gloss of 23 units. This formulation is a preferred blend of the invention when a matte-finish surface is desired. The photomicrograph of Example [JJ], shown in FIG. 2, also shows an extremely uniform distribution of surface roughness. The SBS/EPRCP blend [KK] on the other hand, showed a very fine linear grainy appearance and a netted non-uniform matte surface could be seen in a macro view. The two SEBS blends, [LL] and [MM], gave surprisingly smooth (non-matte) surfaces with low haze and high gloss.

The 50% by weight blends were further investigated with SIS and SBS copolymers by replacing the EPRCP with a conventional high density polyethylene (HDPE) having a melt index of 0.6 gms/10 min., as in Examples [NN] and [OO], respectively. The HDPE/SIS polymer blend, Example [NN], yielded an excellent, uniform matte finish surface which is defined by about 50% haze and 20 gloss units at 45°. The photomicrograph of Example [NN], shown in FIG. 3, demonstrates a tightly spaced network of jagged high peaks and valleys. Clear area "cracks" form a non-linear irregular network pattern which is characteristic of a uniform matte finish surface when a back-lighted photomicrograph is viewed by the unaided human eye. The HDPE/SBS polymer blend also gave relatively high haze of 23–31% and a low gloss of 44 units; however, the resulting surface finish was a streaky non-uniform matte. A comparison of photomicrographs of Example [OO] (not shown) with photomicrographs of Example [NN], show that the surface of Example [OO] has lower peaks which are more loosely spaced. The clear area cracks in Example [OO] tend to be more linear in nature. The resulting surface, while a form of matte, is not as aesthetically appealing as that of Example [NN].

Figure 5:
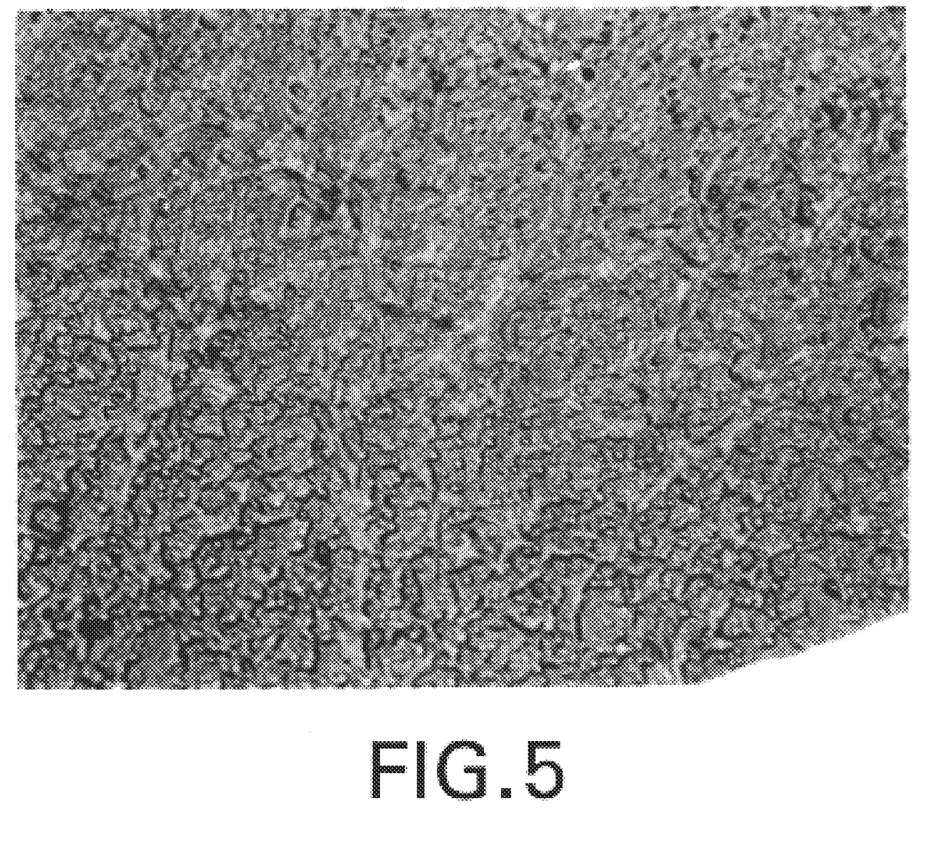
FIG. 5 is a photomicrograph showing the film surface of a layer according to yet another embodiment of the present invention.

The next series of experiments involved blending HDPE and PP homopolymers individually with SIS copolymer at 25, 50, and 75% by weight in order to define the useful range of the invention. The control Examples, [AA] 100% by weight PP, [PP] 100% by weight EPRCP, and [RR] 100% by weight HDPE all gave low haze of <2%, high 45° gloss of >90 units, and smooth non-matte surfaces. As mentioned, photomicrographs of the surfaces of Examples [AA] and [RR] are shown in FIGS. 1 and 4, respectively. Preferred blends of SIS copolymer were identified at 50% by weight, with HDPE Example [TT] and PP Example [WW], both yielding uniform high haze 40%–50% and 57%–71%, respectively, and very low 450 gloss, at 19 units and 10 units, respectively. The surface structure of Example [WW] is shown in the photomicrograph of FIG. 5 and indicates a finer grain and lower peak-to-valley heights than Example [TT] (not shown). The jagged distribution of roughness is completely random in both cases. The 25% by weight loading of SIS in HDPE, Example [SS], gave the appearance of a brushed aluminum matte type surface. Interestingly, the peaks and valley roughness of Example [SS] appeared more linear compared to either Example [TT] or [WW]. The 75% by weight loading of SIS in HDPE, Example [UU], showed a non-uniform grainy surface. Based on this experiment, a preferred range of SIS in HDPE to yield a truly matte finish appearance is between 30% and 70% by weight SIS and, more specifically, between 40% and 60% by weight.

The 25% by weight loading of SIS with PP (75%), as in Example [VV], produced a visually non-matte streaky surface with medium high haze of 4.3%–5.6% and medium low 45° gloss of 73 units. Surface photomicrographs (not shown) indicate low peak height in a random swirl type pattern.

The foregoing experiments demonstrate that a preferred thermoplastic rubber for producing a matte finish film is styrene-isoprene-styrene with a styrene to isoprene ratio of 17/83% by weight. The SIS may preferably be blended at 50% by weight with PP, HDPE, or EPRCP, and then extruded and oriented into a packaging film.

A photomicrograph (not shown) of the Comparison 2 matte finish surface (discussed above) showed that the Comparison 2 surface was much less uniform and less matte in appearance when viewed against the surfaces of the present invention.

TABLE V

SKIN LAYER FORMULATIONS

| Example | Homopolymer Polypropylene | Ethylene Propylene Random Copolymer | High Density Polyethylene | SIS[1] (source 1) | SIS[2] (source 2) | SES[3] | SEBS[4] (source 1) | SEBS[5] (source 2) |
|---|---|---|---|---|---|---|---|---|
| AA | 100 | — | — | — | — | — | — | — |
| BB | — | 90 | — | 10 | — | — | — | — |
| CC | — | 80 | — | 20 | — | — | — | — |
| DD | — | 70 | — | 30 | — | — | — | — |
| EE | — | 60 | — | 40 | — | — | — | — |
| FF | — | 90 | — | — | 10 | — | — | — |
| GG | — | 80 | — | — | 20 | — | — | — |
| HH | — | 70 | — | — | 30 | — | — | — |
| II | — | 60 | — | — | 40 | — | — | — |
| JJ | — | 50 | — | — | 50 | — | — | — |
| KK | — | 50 | — | — | — | 50 | — | — |
| LL | — | 50 | — | — | — | — | 50 | — |
| MM | — | 50 | — | — | — | — | — | 50 |
| NN | — | — | 50 | — | 50 | — | — | — |
| OO | — | — | 50 | — | — | 50 | — | — |
| PP | — | 100 | — | — | — | — | — | — |
| RR | — | — | 100 | — | — | — | — | — |
| SS | — | — | 75 | — | 25 | — | — | — |
| TT | — | — | 50 | — | 50 | — | — | — |
| UU | — | — | 25 | — | 75 | — | — | — |
| VV | 75 | — | — | — | 25 | — | — | — |
| WW | 50 | — | — | — | 50 | — | — | — |
| XX | 25 | — | — | — | 75 | — | — | — |
| YY | — | — | 95 | — | 5 | — | — | — |

[1]Styrene-isoprene-styrene block copolymer having a styrene to rubber ratio of 14:86, a Shore A hardness of 37, and a Brookfield viscosity of 1450 cps at 25% in toluene.
[2]Styrene-isoprene-styrene copolymer having a styrene to rubber ratio of 17:83, a Shore A hardness of 32, and a Brookfield viscosity of 500 cps at 25% in toluene.
[3]Styrene-butadiene-styrene block copolymer having a styrene to rubber ratio of 28:72, a Shore A hardness of 71, and a Brookfield viscosity of 1200 cps at 25% in toluene.
[4]Styrene-ethylene-butylene-styrene diblock terpolymer having a styrene to rubber ratio of 30:70, a Shore A hardness of 60, and a Brookfield viscosity of 200 cps at 25% in toluene.
[5]Styrene-ethylene-butylene-styrene diblock terpolymer differing slightly from SEBS (source 1) in styrene to rubber ratio, hardness and viscosity.

TABLE IV

OPTICS

| Example | % Haze | 45° Gloss | Visual Appearance | FIG. |
|---|---|---|---|---|
| AA | 0.7 | 93 | smooth/glossy | 1 |
| BB | 1.5 | 88 | smooth/glossy | |
| CC | 6.9 | 65 | non-uniform hazy | |
| DD | 4.3 | 84 | non-uniform hazy | |
| EE | 18.5 | 45 | slight matte | |
| FF | 3.0 | 83 | streaky hazy | |
| GG | 7.5 | 65 | non-uniform hazy | |
| HH | 21.7 | 42 | medium matte | |
| II | 21.3 | 36 | uniform matte | |
| JJ | 23.0–33.0 | 23 | uniform matte | 2 |
| KK | 38.0–42.0 | 13–18 | hazy netted pattern (non-uniform matte) | |
| LL | 1.6 | 89 | smooth glossy | |
| MM | 2.6–3.0 | 80 | light haze glossy | |
| NN | 47.0–50 | 20 | uniform matte | 3 |
| OO | 23.1–31.0 | 44 | streaky (non-uniform matte) | |
| PP | 0.5–0.7 | 94 | smooth glossy | |
| RR | 0.8–1.0 | 94 | smooth glossy | 4 |
| SS | 15.1 | 48 | brushed aluminum | |
| TT | 40–51.0 | 19 | uniform matte | |
| UU | 23–25.0 | 54 | non-uniform matte grainy | |
| VV | 4.3–5.6 | 73 | non-matte streaky | |
| WW | 57.0–71.0 | 10 | uniform matte | 5 |
| YY | 5.9–6.7 | 38 | non-matte light streaky hazy | |

Although the present invention has been described in connection with preferred embodiments, it will be appreciated by those skilled in the art that additions, modifications, substitutions and deletions not specifically described may be made without departing from the spirit and scope of the invention defined in the appended claims. For example, although the packaging films of the invention have been described in terms of one, two or three layer films, it is to be understood that films having additional layers such as a metallized layer or other polymeric layers are also within the scope of the present invention.

What is claimed is:

1. A coextruded biaxially oriented polyolefin packaging film comprising a core layer and a cold seal receptive skin layer, said skin layer being formed on one surface of said core layer, said skin layer comprising:

a blend of between about 30% and 60% by weight thermoplastic rubber and between about 40% and about 70% by weight polyolefin polymer, said blend being formed into a film having a thickness of between about 1 and 20 gauge, said thermoplastic rubber is selected from the group consisting of styrene-isoprene-styrene copolymers and styrene-butadiene-styrene copolymers, said polyolefin polymer comprises at least one member selected from the group consisting of polyethylenes having densities in the range of from 0.91 to 0.965 gm/cm$^3$, isotactic homopolymer polypropylene, syndiotactic homopolymer polypropylene, ethylene-propylene random copolymers, ethylene-propylene block copolymers, ethylene-butylene copolymers made by metallocene catalysis, ethylene-hexene copolymers made by metallocene catalysis, ethylene-octene copolymers made by metallocene catalysis, blends of said ethylene-butylene copolymers, said ethylene-hexane copolymers and said ethylene-octene copolymers with syndiotactic homopolymer polypropylene, blends of syndiotactic homopolymer polypropylene with ethylene-propylene random copolymer, and mixtures thereof, and said core layer comprising at least one member selected from the group consisting of isotactic homopolymer polypropylene, ethylene-propylene random copolymers, ethylene-propylene block copolymers, polyethylene having a density in the range of 0.94 to 0.965 gm/cm$^3$ and mixtures thereof formed into a film.

2. The packaging film of claim 1, wherein said thermoplastic rubber is a styrene-isoprene-styrene copolymer having a weight ratio of styrene to isoprene in the range of from 14:86 to 30:70.

3. The packaging film of claim 1, wherein said thermoplastic rubber is a styrene-isoprene-styrene copolymer having a weight ratio of styrene to isoprene of about 17:83.

4. The packaging film of claim 1, wherein said core has a thickness of between about 50 and about 150 gauge.

5. The packaging film of claim 1, wherein the side of said core layer opposite the side having the cold seal receptive skin layer formed thereon has been surface modified.

6. The packaging film of claim 1, wherein said core layer comprises isotactic polypropylene.

7. The packaging film of claim 1, further comprising a cold seal release layer on a surface of said core opposite the surface having the cold seal skin layer formed thereon, wherein said cold seal release layer comprises a polyolefin polymer composition.

8. The packaging film of claim 1, wherein said cold seal skin layer is a matte-finish surface layer and said film further comprises a cold seal receptive layer on a surface of said core layer opposite the surface having the cold seal skin layer formed thereon, said cold seal receptive layer comprising a polyolefin polymer which has been surface treated.

9. The packaging film of claim 1 further comprising crosslinked silicone particles having an average particle size of between about 2 and 4.5 microns in an amount of between about 1,000 and about 10,000 ppm.

10. The packaging film of claim 1, wherein said polyolefin polymer of said blend comprises polyethylene having a density in the range of 0.94 to 0.965 gm/cm$^3$.

11. The packaging film of claim 1, further comprising a cold seal cohesive applied to a surface of said cold seal receptive skin layer opposite the surface contacting said core layer.

12. The packaging film of claim 1, wherein said cold seal receptive skin layer has a thickness in the range of from about 4 to about 8 gauge.

* * * * *